United States Patent [19]

Bernard

[11] Patent Number: 5,013,127
[45] Date of Patent: May 7, 1991

[54] FLEXIBLE FIBER OPTIC DISTRIBUTION CABLE

[75] Inventor: Werner Bernard, Hickory, N.C.

[73] Assignee: Siecor Corporation, Hickory, N.C.

[21] Appl. No.: 514,747

[22] Filed: Apr. 26, 1990

[51] Int. Cl.$^5$ .................... G02B 6/44; H02G 15/22
[52] U.S. Cl. .................... 350/96.23; 350/96.10; 174/20
[58] Field of Search ............ 350/96.23, 96.10, 96.34; 174/20, 23 R, 116, 70 R; 523/173

[56] References Cited

U.S. PATENT DOCUMENTS

| | | | |
|---|---|---|---|
| 4,072,398 | 2/1978 | Larsen et al. | 350/96.23 |
| 4,232,935 | 11/1980 | Rohner et al. | 350/96.23 |
| 4,666,244 | 5/1987 | Vandervelde et al. | 350/96.23 |
| 4,723,831 | 2/1988 | Johnson et al. | 350/96.23 |
| 4,729,628 | 3/1988 | Kraft et al. | 350/96.23 |
| 4,743,085 | 5/1988 | Jenkins et al. | 350/96.23 |
| 4,765,712 | 8/1988 | Bohannon, Jr. et al. | 350/96.23 |
| 4,892,382 | 1/1990 | Story et al. | 350/96.23 |
| 4,906,067 | 3/1990 | Mayr et al. | 350/96.23 |
| 4,909,592 | 3/1990 | Arroyo et al. | 350/96.23 |
| 4,960,318 | 10/1990 | Nilsson et al. | 350/96.23 |
| 4,969,706 | 11/1990 | Hardin et al. | 350/96.23 |
| 4,971,420 | 11/1990 | Smith | 350/96.23 |
| 4,974,926 | 12/1990 | Blee et al. | 350/96.23 |

*Primary Examiner*—Brian Healy
*Attorney, Agent, or Firm*—J. David Abernethy

[57] ABSTRACT

Described is a fiber optic distribution cable having increased flexibility despite the presence of a metallic shield. The shield is a metal tape having dense transverse corrugations. Flexibility also arises from the use of multiple strength members and filaments rather than a single tensile strength member. Such flexibility is highly useful when routing the cable through distribution pedestals.

11 Claims, 2 Drawing Sheets

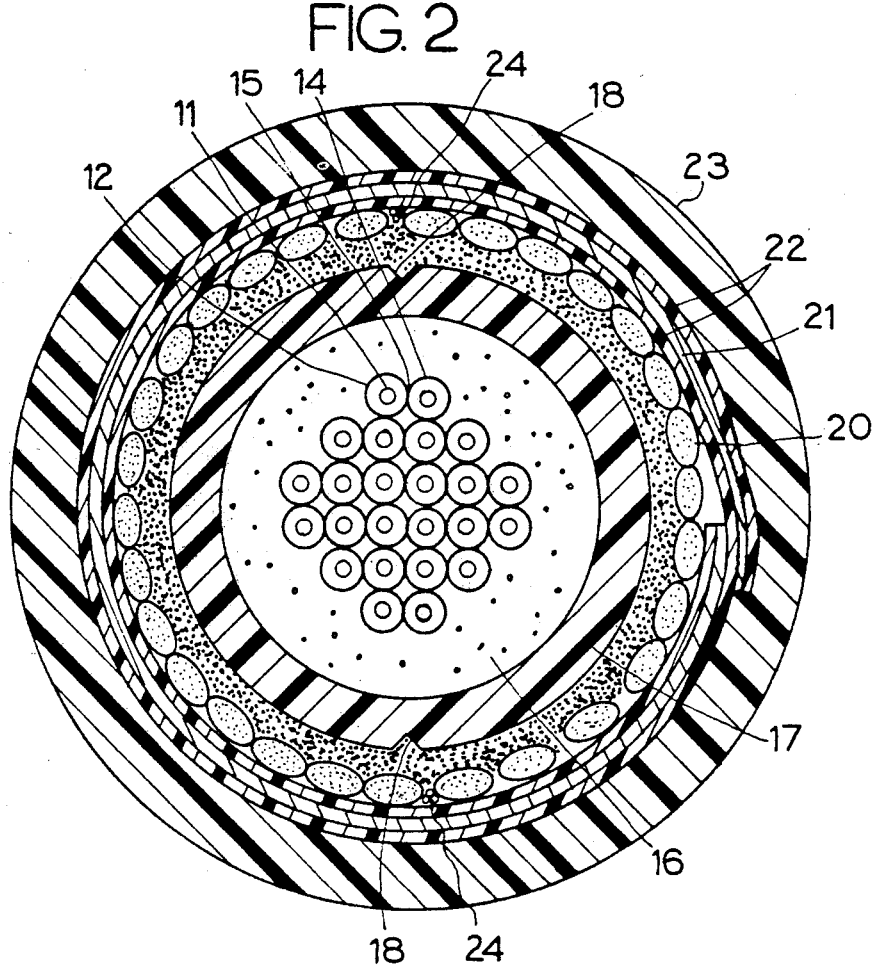

FLEXIBLE FIBER OPTIC DISTRIBUTION CABLE

BACKGROUND OF THE INVENTION

The field of the invention is that of fiber optic outdoor distribution cables.

Field trials are underway to extend the use of optical fibers from large telecommunication trunk cables to local networks carrying optical fibers to local subscribers, such as individuals or small businesses. Such distribution cables must carry a smaller number of optical fibers than the larger trunk cables and must have the capability to branch off individual optical fibers or optical fiber subunits. Traditionally, routing of smaller communication cables takes place through existing distribution pedestals or other enclosures providing limited internal space. In such enclosures, cables having a smaller minimum bending radius have an advantage over cables having a larger minimum bending radius. The minimum bending radius as used herein is that bending radius through which an optical cable may be flexed over a long period of time without a significant increase in attenuation of signal.

Another requirement of such distribution cables is that they be able to function in outdoor environments. Such environments require means to resist the invasion of water and rodent attacks and further provide protection against tensile forces and blows to the exterior of the cable.

BRIEF SUMMARY OF THE INVENTION

The foregoing requirements are met in the cable according to the invention. This cable has a core constituting a plurality of light waveguide pairs in a waterblocking gel; the optical fiber pair and gel are contained in a first plastic tube. Surrounding the first plastic tube is a layer of densely packed strength member filaments such as fiberglass. Surrounding the fiberglass is a layer of flexible rods which are resistant both to tensile and compressive forces. Surrounding the rods is a densely corrugated metal tube. Surrounding the metal tube is a second plastic tube containing the metallic tube.

BRIEF DESCRIPTION OF THE DRAWINGS

The preferred embodiment of the invention is described according to the following figures, in which:

FIG. 2 is a cross-sectional view of the cable along line 2—2 of FIG. 1.

DETAILED DESCRIPTION OF THE PREFERRED EMBODIMENT

Figure 1:
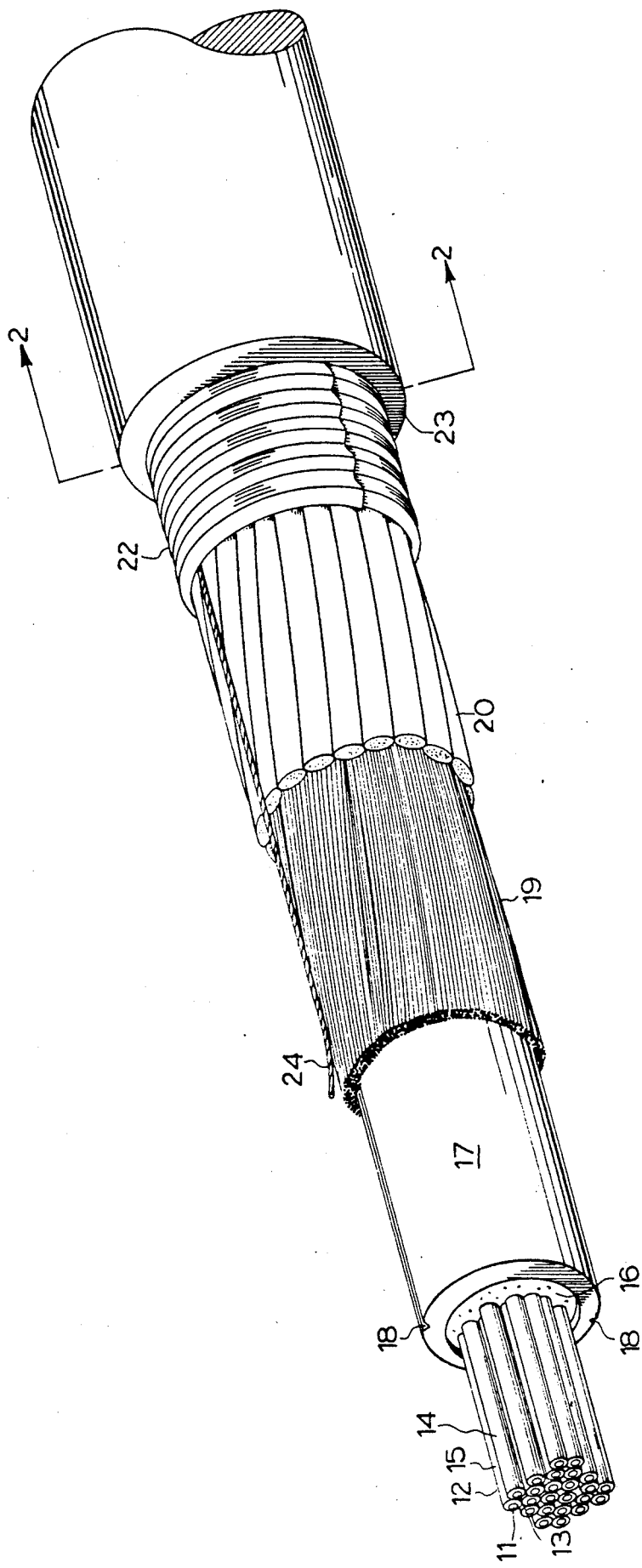
FIG. 1 is a perspective cutback view of the cable.

The cable according to the preferred embodiment has a core composed of a plurality of optical fiber pairs and a waterblocking compound 16. One such pair includes two optical fibers 11, 13 having respective plastic buffer tubes 12, 14. Buffer tubes 12 and 14 are joined side by side at 15. This is accomplished by extruding plastic simultaneously over two optical fibers through a die having two holes. The two buffer tubes emerge from the die rather close together, but not touching. The buffer tubes are then pressed together while they are still hot so that they melt together. The strength of junction 15 is controlled by varying the distance from the die to the area where the tubes are pushed together. For the use according to this invention, it is desirable that the tubes be rather easily separable by cutting at area 15 on one end of a pair and then pulling the tubes manually. For this purpose, the thickness of joint 15 is less than the outer diameter of buffer tubes 12 and 14.

The fiber pairs and waterblocking compound 16 are then injected into an extruded first tube, which is inner plastic tube 17. Notches 18 are placed in first tube 17 to allow workers to gain entry to tube 17 more easily. By cutting through tube 17 at notches 18 workers can then pull tube 17 apart manually.

Surrounding tube 17 is a layer of densely packed loose fiberglass 19 and a layer 20 of glass fiber members embedded in a resinous material, marketed under the name Hercuflex.

Surrounding the Hercuflex layer 20 is a tube formed from steel tape 21 having a plastic coating 22 thereon. The plastic coated steel tape tube is formed by moving a flat sheet through a cone of decreasing diameter in the direction of motion. Sealing occurs at the area of overlap through intermelting of adjacent plastic layers 22, resulting in a longitudinal seam. Underlying the steel tape are aramid fiber rip cords 24.

Steel tape 21 has transverse corrugations as shown in FIG. 1. The corrugations should have a density of at least 15 corrugations per inch and preferably at least 22 corrugations per inch, with a corrugation depth of less than 0.30 millimeters, preferably around 0.25 millimeters. The resulting cable has a long term minimum bending radius not exceeding 150 millimeters. The transverse corrugations in steel tape 21 may be annular, as shown, or helical. One method for processing a corrugated steel tape in an optical fiber cable is as described in U.S. Pat. No. 4,232,935, incorporated herein by reference.

Surrounding the steel tape is an outer, or second, plastic tube 23 formed of middle density polyethylene.

We claim:

1. A fiber optic cable, comprising:
   (a) a first tube containing a plurality of optical fibers;
   (b) a second tube containing the first tube; and,
   (c) a metallic tube having at least 15 transverse corrugations per inch between the first tube and the second tube.

2. A fiber optic cable as recited in claim 1, wherein the metallic tube has at least 22 transverse corrugations per inch.

3. A fiber optic cable as recited in claim 2, wherein the metallic tube has a corrugation depth of less than 0.30 millimeters.

4. A fiber optic cable as recited in claim 3 having a long term minimum bending radius not exceeding 150 millimeters.

5. A fiber optic cable as recited in claim 2, wherein the metallic tube comprises a steel tape having a longitudinal seam.

6. A fiber optic cable, comprising:
   (a) a plurality of light waveguides being mechanically combined in the form of light waveguide pairs;
   (b) a first plastic tube containing said light waveguide pairs and a waterblocking material;
   (c) a metallic tube having at least 22 transverse corrugations per inch containing the first plastic tube;
   (d) reinforcing members between the metallic tube and the first plastic tube; and,
   (e) a second plastic tube containing the metallic tube.

7. A fiber optic cable as recited in claim 6, wherein the metallic tube has a corrugation depth of less than 0.30 millimeters.

8. A fiber optic cable as recited in claim 6 having a long term minimum bending radius not exceeding 150 millimeters.

9. A fiber optic cable as recited in claim 7 having a long term minimum bending radius not exceeding 150 millimeters.

10. A fiber optic cable as recited in claim 7, wherein each optical fiber in a light waveguide pair is coated with a rubber or plastic material and the pair is joined by the rubber or plastic material having a thickness less than the outer diameter of either of the two coated light waveguides of the pair.

11. A fiber optic cable as recited in claim 10, wherein the first plastic tube is notched and a ripcord underlies the metallic tube.

* * * * *